(12) United States Patent
Wang et al.

(10) Patent No.: US 8,219,794 B1
(45) Date of Patent: Jul. 10, 2012

(54) NON-DISRUPTIVE FIRMWARE UPGRADE OF A STORAGE SHELF

(75) Inventors: Feng Wang, Sunnyvale, CA (US); Wayne Booth, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 329 days.

(21) Appl. No.: 12/611,863

(22) Filed: Nov. 3, 2009

(51) Int. Cl.
G06F 9/00 (2006.01)
G06F 15/177 (2006.01)
G06F 3/00 (2006.01)
G06F 12/00 (2006.01)
G06F 9/44 (2006.01)
G06F 9/445 (2006.01)

(52) U.S. Cl. .................... 713/2; 713/1; 709/222; 710/8; 711/114; 717/170; 717/176

(58) Field of Classification Search .................. 713/1, 2; 709/222; 710/8; 711/114; 717/170, 176
See application file for complete search history.

(56) References Cited

U.S. PATENT DOCUMENTS

| | | | | |
|---|---|---|---|---|
| 6,237,091 B1 * | 5/2001 | Firooz et al. | ...................... | 713/1 |
| 6,964,008 B1 * | 11/2005 | Van Meter, III | .............. | 714/807 |
| 7,032,218 B2 * | 4/2006 | Shirasawa et al. | ............ | 717/168 |
| 7,185,331 B2 * | 2/2007 | Talati et al. | .................... | 717/168 |
| 7,523,378 B2 * | 4/2009 | Dammann et al. | ............ | 714/758 |
| 7,558,915 B2 * | 7/2009 | Cherian et al. | ................ | 711/114 |
| 2008/0276222 A1 * | 11/2008 | Yamagami | .................... | 717/124 |
| 2010/0058322 A1 * | 3/2010 | Oikawa et al. | ................ | 717/173 |

* cited by examiner

*Primary Examiner* — Stefan Stoynov
(74) *Attorney, Agent, or Firm* — Blakely, Sokoloff, Taylor & Zafman LLP

(57) ABSTRACT

A storage system includes a storage server and a storage subsystem having an I/O module coupled to disks. The storage subsystem receives new firmware from the storage server for an I/O module in the storage subsystem. The storage subsystem stores state data for the I/O module. The storage subsystem reboots a CPU for the I/O module to load the new firmware and determines after reboot that the reboot was for loading the new firmware based on the stored state data. The storage subsystem initializes the I/O module to use the new firmware. The initialization of the I/O module is based on the stored state data, does not reset I/O routing hardware on the I/O module, and is independent of the I/O module processing a request to access data stored on disks coupled to the I/O module.

19 Claims, 5 Drawing Sheets

NON-DISRUPTIVE FIRMWARE UPGRADE OF A STORAGE SHELF

This invention relates generally to upgrading firmware for an I/O module in a storage system, and more particularly to upgrading the firmware of the I/O module in the storage system without disrupting the processing of I/O requests by the I/O module.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2009, NetApp, Inc., All Rights Reserved.

BACKGROUND OF THE INVENTION

Various types of network-based storage systems exist today, including network attached storage (NAS), storage area networks (SANs), and others. Network storage systems are commonly used for a variety of purposes, such as providing multiple users with access to shared data, backing up critical data (e.g., by data mirroring), and the like.

A network-based storage system typically includes at least one storage server, which is a processing system configured to store and retrieve data on behalf of one or more client processing systems ("clients"). A storage server operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups. A storage server provides clients with file-level access. Some storage servers may additionally provide block-level access.

Current storage systems are generally packaged in either of two main forms: 1) an all-in-one custom-designed system that is essentially a standard computer with built-in disk drives, all in a single chassis ("enclosure"), or 2) a modular system in which one or more sets of disk drives, each in a separate chassis, are connected to a disk drive controller, and the sets of disk drives and controller are coupled to a storage server. Each disk shelf includes a set of disks that is coupled to an I/O module (shelf controller) which controls the set of disks.

A client sends an I/O request to a storage server to access data stored on the disks coupled to an I/O module in the storage subsystem. The storage subsystem receives and processes the I/O request from the storage server. The storage server also can send new firmware for an I/O module to the storage subsystem. There is not, however, a mechanism for a storage subsystem to upgrade the firmware for an I/O module to the new firmware without disrupting the processing of I/O requests by the I/O module.

SUMMARY OF THE INVENTION

A storage system includes a storage server, and a storage subsystem having an I/O module coupled to disks. The storage subsystem receives new firmware from the storage server for an I/O module in the storage subsystem. The storage subsystem stores state data for the I/O module. The storage subsystem reboots a CPU for the I/O module to load the new firmware and determines after reboot that the reboot was for loading the new firmware based on the stored state data. The storage subsystem initializes the I/O module to use the new firmware. The initialization of the I/O module is based on the stored state data, does not reset I/O routing hardware on the I/O module, and is independent of the I/O module processing a request to access data stored on disks coupled to the I/O module.

The present invention is described in conjunction with systems, clients, servers, methods, and computer-readable media of varying scope. In addition to the aspects of the present invention described in this summary, further aspects of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A storage subsystem includes one or more storage shelves and each storage shelf includes one or more I/O modules. An I/O module includes I/O routing hardware to process client I/O requests to access data stored on disks coupled to the I/O module and a firmware upgrade architecture for upgrading the firmware for the I/O module. The storage subsystem receives new firmware for the I/O module from a storage server. The firmware upgrade architecture of the present invention provides the ability to upgrade the firmware of the I/O module without disrupting the processing of client I/O requests by the I/O module. The firmware upgrade architecture does not disrupt the firmware download traffic to other I/O modules on different storage shelves in the same storage subsystem, hence, more than one I/O module can be updated at a time. The firmware upgrade architecture, therefore, greatly reduces the amount of time it takes to update the firmware for a number of I/O modules in a large system with dozens of disk shelves. The I/O routing hardware includes a routing table to map and route each I/O request. When the CPU for an I/O module is rebooted to load the new firmware, the routing tables are not disturbed, and the I/O module, therefore, can continue to route the I/O request. The firmware upgrade architecture further provides the ability to manage the I/O routing hardware on the I/O module using the new firmware.

Figure 1:
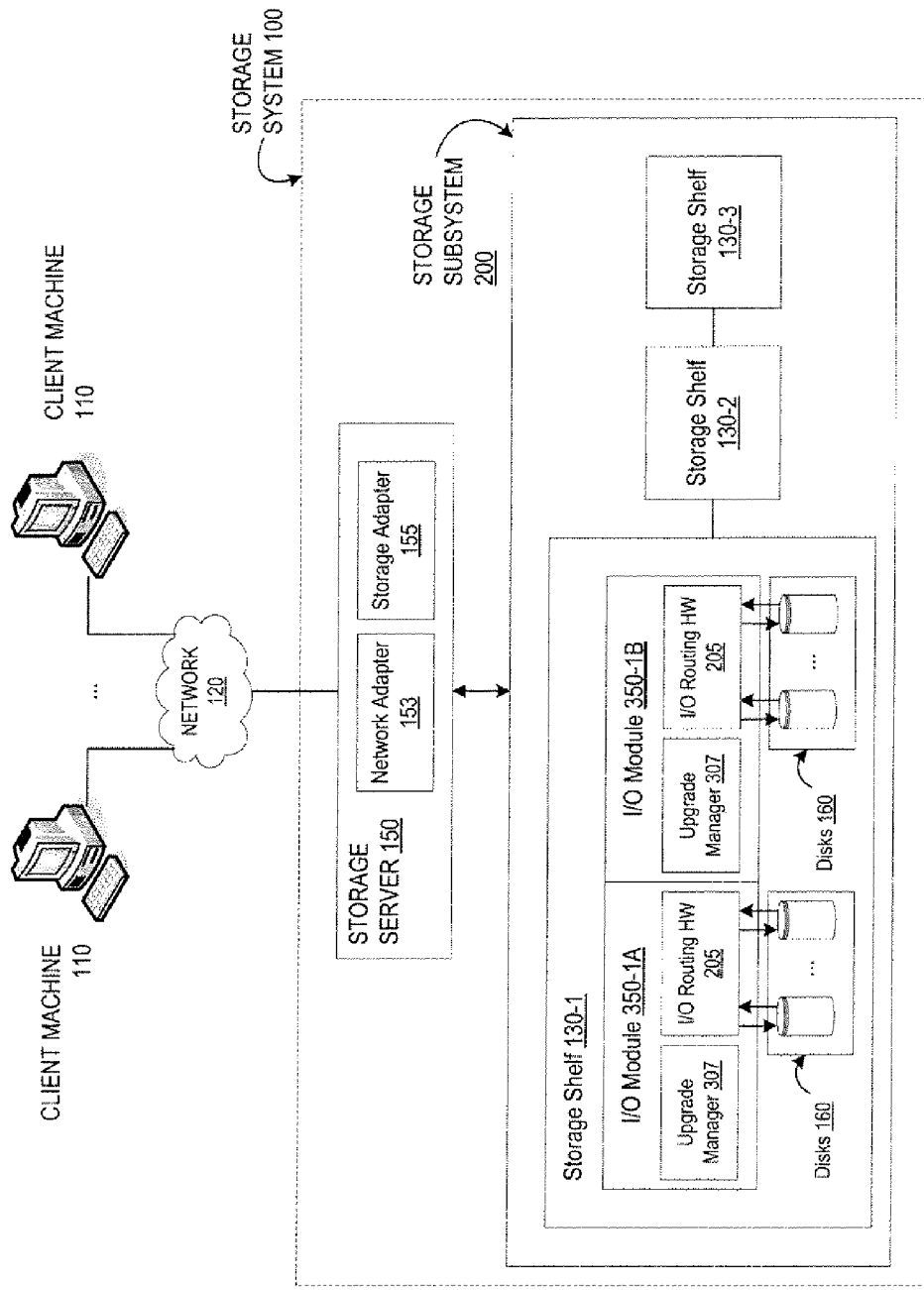
FIG. 1 illustrates an embodiment of a networked storage system.
Figure 2:
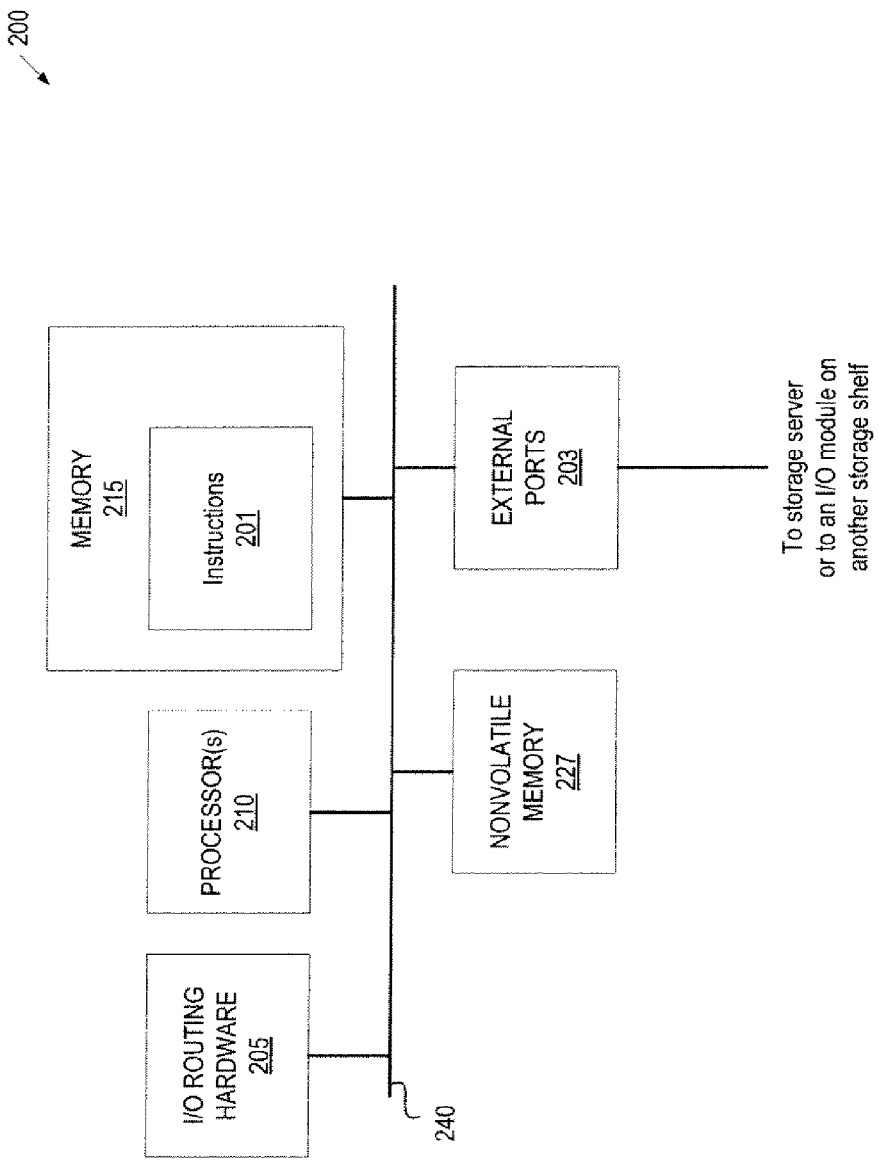
FIG. 2 illustrates an embodiment of an I/O module in a networked storage subsystem.

FIG. 1 shows a network storage system 100 according to some embodiments of the firmware upgrade architecture. FIG. 1 shows an example of a network environment in which a storage server 150 and a storage subsystem 200 operate. The storage subsystem 200 can be a modular system of storage shelves in which the firmware upgrade architecture can be implemented. FIG. 2 describes the components of the storage subsystem 200 in further detail below.

The storage server 150 is coupled to a storage subsystem 200, which includes an array of mass storage devices (e.g., disks 160), and connected to a set of storage client machines 110 (hereinafter simply "clients") through a network 120. The network 120 may be, for example, a local area network (LAN), a wide area network (WAN), such as the Internet, a Fibre Channel fabric, a wireless network, or the like, or a combination of any such types of networks. Each of the clients 110 can be, for example, a conventional personal computer (PC), server-class computer, workstation, or the like.

The storage subsystem 200 includes a number of storage shelves 130-1 to 130-3. A storage shelf 130-1 includes a set of disks 160 (disks), and one or more shelf controllers (e.g., I/O modules 350-1A and 350-1B) to control the set of disks 160. A shelf controller is referred to herein as an I/O module (e.g., I/O module 350-1A). A person of ordinary skill in the art would appreciate that the firmware upgrade architecture described herein can be applied to any storage shelf topology, including, but not limited to, Fibre Channel-Arbitrated Loop (FC-AL), Serial Attached Small Computer System Interface (SAS), Internet Small Computers Systems Interface (iSCSI), and the like. Storage system 100 illustrates an example of implementing the firmware upgrade architecture where, using SAS technology, storage shelves 130-1 to 130-3 are in the same SAS domain. There can be a greater or smaller number of storage shelves 130-1 to 130-3 in a SAS domain. Although not illustrated, using Fibre Channel (FC) technology, storage shelves 130-1 to 130-3 may be configured in a loop topology, as is known in the art. For example, the storage shelves 130-1 to 130-3 may be coupled together to form a loop. There can be a greater or smaller number of storage shelves 130-1 to 130-3 in a loop, there can be more than one loop attached to the storage server 150, or there can be one loop for every storage shelf 130-1 to 130-3.

Figure 3:
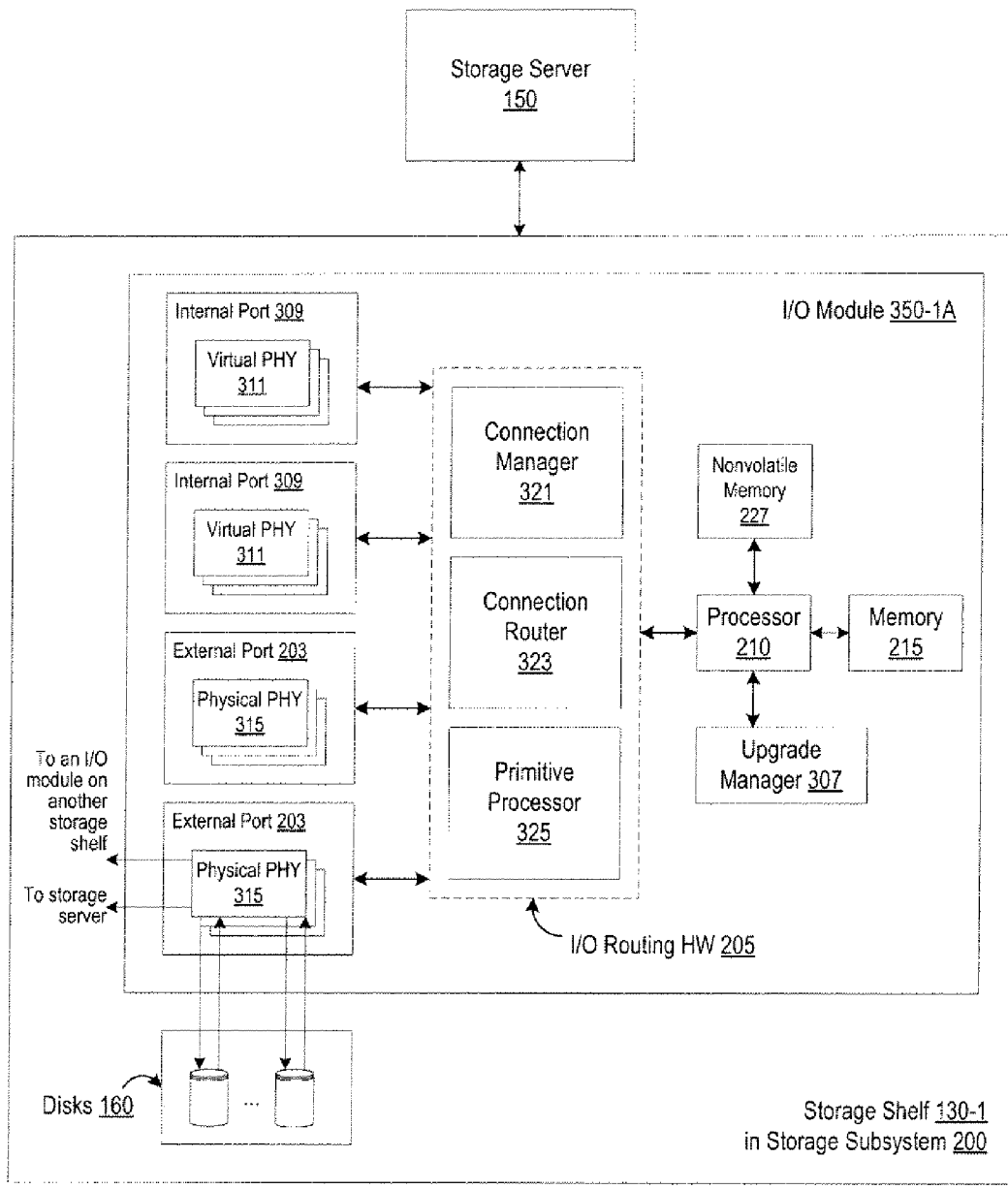
FIG. 3 illustrates an embodiment of a firmware upgrade architecture in a storage subsystem for upgrading firmware for an I/O module.

A storage shelf 130-1 to 130-3 includes one or more I/O modules 350-1A,B and disks 160 coupled to each I/O module. FIG. 3 describes the firmware upgrade architecture of the I/O module 350-1A in further detail below. The storage shelf 130-1 includes two I/O modules 350-1A and 350-1B. I/O module 350-1B is a partner module to I/O module 350-1A and I/O module 350-1A is a partner module to I/O module 350-1B. An I/O module 350-1A, 350-1B serves as a communications interface between the storage server 150 and the disks 160 in the storage shelf 130-1. The disks 160 in the storage shelf 130-1 can be connected to the I/O module 350-1A by a SAS connection, standard FC connection, etc.

The storage server 150 receives and responds to various I/O requests (e.g., read and write requests) from the clients 110, that are directed to data stored in, or to be stored in, the mass storage devices (e.g., disks 160) in the storage subsystem 200. The storage server 150 includes a network adapter 153 for communicating with remote devices, such as clients 110 over network 120, to receive data access requests (I/O requests to access disks) from the remote devices 110. The storage server 150 sends the I/O requests to the storage subsystem 200 for processing. The storage server 150 includes a storage adapter 155 coupled to the I/O modules 350-1A,B in the storage subsystem 200 to access the data stored in, or to be stored in, the mass storage devices (e.g., disks 160). The storage server 150 can also be coupled through a switching fabric to other similar storage servers (not shown), which have their own local storage subsystems. In this way, all of the storage subsystems 200 can form a single storage pool, to which any client of any of the storage servers has access.

The storage server 150 also sends firmware upgrades to the storage subsystem 200 for the I/O modules 350-1A,B in the storage subsystem 200. Each I/O module 350-1A,B includes I/O routing hardware 205 to route I/O requests to access data stored on disks 160. Each I/O module 350-1A,B also includes an upgrade manager 307 to upgrade the firmware for the I/O module 350-1A,B without disrupting the processing of I/O requests by the I/O module 350-1A,B by the I/O routing hardware 205. The storage subsystem 200 upgrades the firmware for the I/O module independent of the I/O module I/O processing. The I/O routing hardware includes a routing table to map and route each I/O request. When the CPU for the I/O module is rebooted to load the new firmware, the routing tables are not disturbed, and the I/O module, therefore, can continue to route the I/O request. The firmware upgrade, therefore, is independent of the I/O module's processing of I/O request. More than one I/O module can be updated at a time. The firmware upgrade architecture, therefore, greatly reduces the amount of time it takes to update the firmware for any number of I/O modules in a large system with dozens of disk shelves. For example, in a SAS topology, I/O modules in the same SAS domain can be updated at the same time. When the firmware for the I/O modules on storage shelf 130-1 is upgraded, the data traffic (including firmware download traffic, enclosure management traffic, data I/O traffic) to storage shelf 130-2 and storage shelf 130-3 is non-disruptive. The firmware upgrade architecture, therefore, ensures the processing of I/O requests is non-disruptive, as well as ensures the data traffic to other I/O modules in the same SAS domain (or FC loop) is also non-disruptive.

The mass storage devices (e.g., disks 160) in the storage subsystem 200 can be, for example, conventional magnetic disks, optical disks such as CD-ROM or DVD-based storage, magneto-optical (MO) storage, or any other type of non-volatile storage devices suitable for storing large quantities of data. In one embodiment, the mass storage devices (e.g., disks 160) are each a flash-based solid-state device (SSD), sometimes known as flash drives. The disks 160 can further be organized as a Redundant Array of Inexpensive Disks/Devices (RAID), whereby the storage server 150 accesses the disks 160 using one or more RAID protocols known in the art.

It will be appreciated that certain embodiments of the present invention may be implemented with solid-state memories including flash storage devices constituting storage array (e.g., disks 160). For example, a storage server (e.g., storage server 150) may be operative with non-volatile, solid-state NAND flash devices which are block-oriented devices having good (random) read performance, i.e., read operations to flash devices are substantially faster than write operations. Data stored on a flash device are accessed (e.g., via read and write operations) in units of pages, which in the present embodiment are 4 kB in size, although other page sizes (e.g., 2 kB) may also be used. When the flash storage devices are organized as one or more parity groups in a RAID array, the data is stored as stripes of blocks within the parity groups, wherein a stripe may constitute similarly located flash pages across the flash devices. For example, a stripe may span a first page 0 on flash device 0, a second page 0 on flash device 1, etc. across the entire parity group with parity being distributed among the pages of the devices. Note that other RAID group arrangements are possible, such as providing a RAID scheme wherein every predetermined (e.g., 8th) block in a file is a parity block.

The network adapter 153 can be, for example, an Ethernet adapter, SAS adapter, or FC adapter. The storage adapter 155 can be, for example, a FC adapter or a SCSI adapter, for servicing client requests received via network adapter 153. Although illustrated as a self-contained element, the storage server 150 may have a distributed architecture. For example, the storage server may include a separate N-("network") blade (not shown) and D-("data") blade (not shown). In such an embodiment, the N-blade is used to communicate with remote devices, such as clients 110 over network 120, while the D-blade includes the file system functionality and is used to communicate with an associated storage subsystem, such as storage subsystem 200. The N-blade and D-blade can communicate with each other using an internal protocol. One embodiment of this invention can be operative in that the D-blade is coupled to an I/O module, such as I/O module 350-1A. Alternatively, the storage server 150 can have an integrated architecture, where the network and data components are all contained in a single box, for example, as illustrated in FIG. 1.

FIG. 2 is a high-level block diagram showing an example of the components for an I/O module in a storage subsystem 200 which upgrades firmware for the I/O module without disrupting the processing of I/O requests by the I/O module. The storage subsystem 200 includes one or more I/O modules (e.g., as illustrated in FIG. 1). An I/O module includes one or more processors 210 and memory 215 connected via an interconnect 240. Interconnect 240 represents any one or more separate physical buses, point to point connections, or both connected by appropriate bridges, adapters, or controllers. Interconnect 240, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I²C) bus, or an Institute of Electrical and Electronics Engineers (IEEE) standard 1394 bus, sometimes referred to as "Firewire."

Processor(s) 210 may include central processing units (CPUs) of an I/O module (e.g., I/O modules 350-1A,B in FIG. 1) in a storage subsystem 200 and thus controls the overall operations of the I/O module. In certain embodiments, processor(s) 210 accomplish this by executing instructions 201 stored in memory 215 or firmware stored in nonvolatile memory 227. Processor(s) 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. In one embodiment, the processor 210 is a single device that includes a CPU for the I/O module and the I/O routing hardware 205. In another embodiment, the CPU for the I/O module is on a processor 210 that is a separate device from I/O routing hardware 205 and controls the I/O routing hardware device 205 through interconnect 240. I/O routing hardware 205 includes a connection manager device, a connection router device, and a primitive processor, which is described in greater detail below in conjunction with FIG. 3. For example, using SAS technology, I/O routing hardware 205 includes an expander connection manager (ECM), an expander connection router (ECR), and a broadcast propagation processor (BPP). The I/O routing hardware 205 includes a routing table (not shown) to map and route each I/O request. When the CPU (e.g., on processor 210) for the I/O module is rebooted to load the new firmware, the routing tables are not disturbed, and the I/O module, therefore, can continue to route the I/O request.

Nonvolatile memory 227 stores firmware for the I/O module. Nonvolatile memory 227 can be implemented as, for example, CMOS, flash memory, or any type of memory system that can maintain data even after power is removed from the system. Memory 215 is, or includes, the main memory of an I/O module. Memory 215 represents any form of random access memory (RAM), read-only memory (ROM), SRAM, or the like. In use, memory 215 may contain a set of computer-executed instructions 201 which, when executed by processor(s) 210, causes processor(s) 210 to perform operations to implement aspects of the present invention. In one embodiment, the firmware upgrade mechanism resides in memory 215 enabling storage subsystem 200 to upgrade the firmware for an I/O module without disrupting the processing of I/O requests by the I/O module as further discussed herein. The firmware upgrade mechanism may be implemented in computer-executable software, firmware, hardware or some combination thereof, and is discussed further in reference to FIG. 3. Memory 215 also stores state data for various hardware states and software states for an I/O module, as described in greater detail below in conjunction with FIGS. 4 and 5. Memory 215 maintains the state data when the CPU for the I/O module (e.g., CPU on processor 210) is reset.

External ports 203 allow I/O routing hardware 205 to route I/O traffic for enabling the storage server to access the mass storage devices (e.g., disks 160 in FIG. 1) in the storage subsystem 200. External ports 203 also connect one storage shelf to another storage shelf (an I/O module on another storage shelf). For example, external ports 203 connect an I/O module in storage shelf 130-1 to an I/O module (not shown) in storage shelf 130-2 in FIG. 1. Therefore, the storage server 150 can access the disks (not shown) on storage shelf 130-2 and download firmware to storage shelf 130-2 through the I/O module (e.g., I/O module 350-1A,B) on storage shelf 130-1. In an SAS example, external ports 203 connect storage shelves in the same SAS domain. In a FC example, external ports 203 connect storage shelves in the same FC loop.

FIG. 3 shows a firmware upgrade architecture in a storage subsystem 200 for upgrading firmware for an I/O module without disrupting the processing of I/O requests by the I/O module according to one embodiment. FIG. 3 is described in terms of Small Computer Systems Interface (SCSI) interface transports and commands for communication between the storage server 150 and the I/O module 350-1A in the storage subsystem 200. For example, Serial Attached SCSI (SAS) can be used. However, one skilled in the art would understand that other interface transports and commands can be used. One skilled in the art would also understand that the firmware upgrade architecture in a storage subsystem 200 can be implemented in any system that includes a CPU for the I/O module that is embedded in the same device as I/O routing hardware 205, or includes a CPU on a separate device from I/O routing hardware 205 and controls the I/O routing hardware device 205 through an interconnect (e.g., interconnect 240 in FIG. 2).

In one embodiment, the storage server 150 is a storage server product of NetApp, Inc., Sunnyvale, Calif. However, it is expressly contemplated that any appropriate storage server and storage operating system can be enhanced for use in accordance with the control architecture described herein.

The storage server 150 receives a request from a client, such as client 110 in FIG. 1, to access data stored on disks (e.g., disks 160) coupled to I/O module 350-1A in storage shelf 130-1 of storage subsystem 200.

The I/O module 350-1A includes one or more internal ports 309 and external ports 203. The internal ports 309 and the external ports 203 can be Serial SAS ports. The external ports 203 include one or more physical layer connections ("PHY"). A physical PHY connects a device to a physical medium. For example, physical PHY 315 are connections from the processor 210 to disks 160, other storage shelves (e.g., an I/O module in storage shelf 130-2 in FIG. 1), or a host, such as storage server 150.

The I/O module 350-1A includes routing tables to map and direct each I/O request to a physical PHY 315. I/O routing hardware 205 includes a routing table to map and route each I/O request independent of the CPU for the I/O module (e.g., a CPU on processor 210) and memory 215. When the CPU for the I/O module is rebooted to load the new firmware, the routing tables are not disturbed, and the I/O module, therefore, can continue to route the I/O request. The firmware upgrade for the I/O module, therefore, is independent of the I/O module's processing of I/O request. The routing tables stored in I/O routing hardware 205 are stored in a format for quick routing table look up from destination address to outgoing PHY. Memory 215 stores a copy of the routing table in a different format to easily maintain, manage, and retrieve a routing table. For example, when a physical PHY 315 is unavailable (e.g., the physical PHY 315 goes down), the entries relating to the physical PHY 315 that are stored in the routing table in memory 215 can be deleted. The CPU on processor 210 maintains the consistency between the routing table stored in memory 215 and the routing table stored in I/O routing hardware 205. For example, when a new routing table entry is added or when an entry is deleted using the routing table stored in memory 215. The CPU on processor 210 updates the routing table in memory 215 as well the routing table stored in I/O routing hardware 205.

Each internal port 309 includes one or more virtual PHY that are connections to management or diagnosis firmware, such as firmware stored in memory 227. The virtual PHY 311 manages SCSI Enclosure Services (SES) and management protocol, for example, the Serial Management Protocol (SMP) in an SAS topology, for the I/O module. SES manages the hardware in a storage shelf, such as, the number of I/O modules, the number of disk drives, the number of fans and the fan feeds, the temperatures of the devices coupled to the I/O module, etc. SMP manages the discovery of the devices in the storage topology, the responses to the storage server to control the PHY of the I/O module, to retrieve the routing table of the I/O module, etc.

The I/O module 350-1A includes I/O routing hardware 205 to establish an operating connection with a desired device, such as a SAS device (e.g., disks 160), or an I/O module on another storage shelf. I/O routing hardware 205 includes a connection manager 321, a connection router 323, and a primitive processor 325. This division of functionality is presented by way of example for sake of clarity. One skilled in the art would understand that the functionality described could be combined into a monolithic component or subdivided into any combination of components. Frames (including commands) are transmitted in SAS protocol exchanges. An I/O request can comprise of SAS frames and a destination address. The connection router 323 is an addressing mechanism for routing a request (e.g., the SAS frames) between pairs of physical PHY 315 or virtual PHY 311 The connection manager 321 manages the connections between devices or other I/O modules in other storage shelves. The connection manager 321 maps the destination address for the I/O request to a destination PHY. The connection manager 321 also configures the connection router 323 to route the request (e.g., SAS frames). The I/O routing hardware includes a routing table to map and route each I/O request. For example, the connection manager 321 stores a routing table. When the CPU for the I/O module is rebooted to load the new firmware, the routing table is not disturbed, and the I/O routing hardware on the I/O module, therefore, can continue to route the I/O request. The primitive processor 325 processes one or more primitives, determines which PHY(s) to send the primitives to (e.g., external PHYs), and sends the primitives to the one or more PHY. As in known in the art, data can be passed between layers in the Open System Interconnection Reference Model (OSI Reference Model or OSI Model) through the use of primitives. A primitive is a protocol to communicate between two layers in an OSI model. For example, the primitive processor 325 issues a broadcast primitive to all of the SAS devices indicating that there was a change in the SAS topology. Other technologies, such as FC, may technology other than a broadcast primitive. The physical PHY 315, connection manager 321, and connection router 323 are usually implemented in hardware on the I/O module to route a request (e.g., SAS frames). The virtual PHY 311 and primitive processor 325 may be implemented partially by hardware and partially by firmware stored in memory 227.

Nonvolatile memory 227 stores firmware for the I/O module. The I/O module firmware manages the I/O routing hardware 205. The firmware also manages and controls other hardware components on the I/O module 350-1A, such as power supplies (not shown), disks 160, etc.

A CPU for the I/O module (e.g., on processor 210) loads and executes the firmware for the I/O module. The CPU on processor 210 receives new firmware from the storage server 150 and stores the new firmware in nonvolatile memory 227. The CPU on the processor 210 reboots to load the new firmware for the I/O module. In one embodiment, the CPU on processor 210 is embedded in the same device as the I/O routing hardware (e.g., connection manager 321 and the connection router 323) and reboots without resetting the I/O routing hardware 205 and the external PHYs 315. In another embodiment, the CPU is on a device that is a separate device from the I/O routing hardware 205 (e.g., connection manager 321 and the connection router 323), controls the connection manager 321 and the connection router 323 through an interconnect (e.g., interconnect 240 in FIG. 2), and reboots without resetting the I/O routing hardware 205 and the external PHYs 315.

The upgrade manager 307 determines the state data for the various hardware states and software states for the I/O module. State data is described in greater detail below in conjunction with FIG. 5. The CPU on processor 210 "freezes" the state of the I/O module (e.g., disables the interrupt to keep the I/O module in a known state) and the upgrade manager 307 stores the state data for the hardware states and the software states in memory 215 (e.g., SRAM). The state data is preserved during a reboot of the CPU on processor 210. The upgrade manager 307 uses the stored state data to determine whether the CPU on processor 210 rebooted for the purpose of loading the new firmware on the I/O module.

The upgrade manager 307 initializes the I/O module based on the stored state data without resetting the I/O routing hardware 205 and the external PHYs 315, and thus, without disrupting the processing of I/O requests by the I/O module. In an SAS environment, the upgrade manager 307 initializes the I/O module also without disrupting access to disk shelves on the other storage shelves in the same SAS domain. In a FC environment, the upgrade manager 307 initializes the I/O module also without disrupting access to disk shelves on the other storage shelves in the same FC loop. The upgrade manager 307 restores the hardware states and software states of the I/O module and does not reset the connection manager 321 and the connection router 323. The routing table (e.g., stored in the connection manager 321) is not disturbed, and the I/O module 350-1A, therefore, can continue to route the I/O request (e.g., SAS frames).

After the hardware states and software states are restored, the I/O module 350-1A continues to manage the I/O module hardware components including the I/O routing hardware 205. For example, the I/O module 350-1A continues to update the routing table (e.g., the routing table stored in memory 215), can manage disk drive remove and insert, can manage power supplies remove and insert, can manage cable remove and insert, etc. The I/O module 350-1A also continues to manage and monitor the "health" of the external PHY 315. For example, the I/O module 350-1A monitors the error rate of the external PHYs 315, reports the error rate, or proactively disables a PHY 315 to prevent the PHY 315 from disrupting the normal operation of the storage subsystem 200.

The upgrade manager 307 restores the hardware states and the software states of the I/O module using the stored state data and compares the current states to the restored states. The upgrade manager 307 sends a message to the storage server to re-discover the topology if the current hardware states do not match the stored hardware states.

The connection manager 321 and connection router 323 are implemented in hardware and can be managed by firmware. The upgrade manager 307 and primitive processor 325 can be implemented as hardware, computer-implemented software, firmware or a combination thereof. In one embodiment, the upgrade manager 307 and primitive processor 325 comprise instructions 201 stored in memory 215 executable by processor 210 in FIG. 2 for carrying out the functions of the upgrade manager 307 and primitive processor 325.

Figure 4:
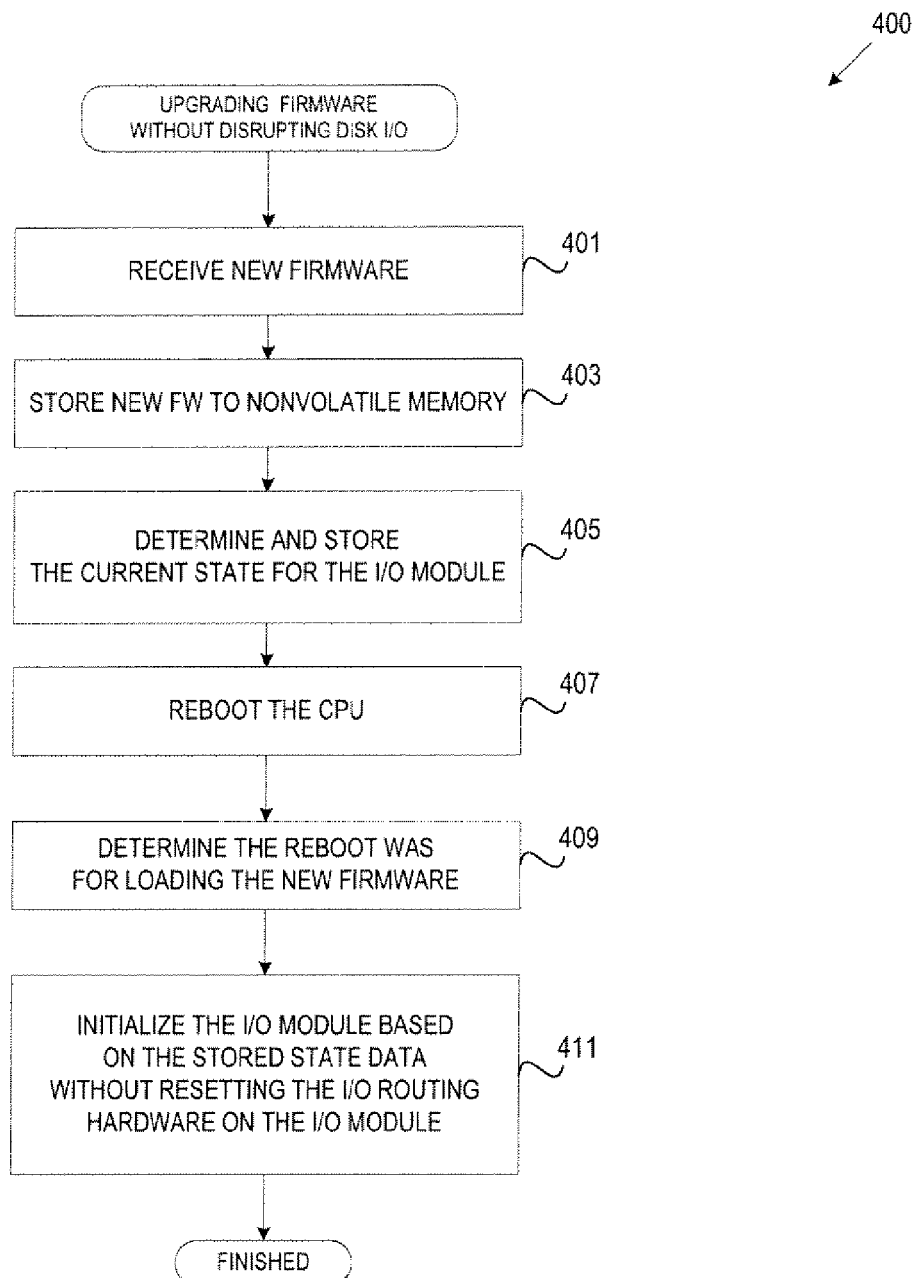
FIG. 4 illustrates a flowchart of a method for upgrading firmware for an I/O module, according to one embodiment.

FIG. 4 illustrates a flowchart for a method 400 for upgrading firmware for an I/O module, such as I/O module 350-1A in storage subsystem 200, executed by upgrade manager 307, according to one embodiment. More than one I/O module can be updated at a time. For example, in a SAS topology, I/O modules in the same SAS domain can be updated at the same time. While firmware for the I/O module is running, the firmware maintains state data for various hardware states and software states for the I/O module. The method stores the state data to memory (e.g., SRAM) coupled to the processor (e.g., memory 215 in FIG. 2 and FIG. 3). The method stores software state data and can further store hardware state data. The state data is preserved in memory even when a CPU on the processor for the I/O module is rebooted. For example, the firmware periodically queries the external PHYs for the link state of the external PHYs and stores the link state as hardware state data in memory (e.g., memory 215 in FIG. 2). In another example, there is a routing table stored in the I/O routing hardware in a format for quick routing table look up. A copy of the routing table is stored in memory (e.g., memory 215 in FIG. 2) in a different format to easily maintain and manage the routing table. In order for the CPU for the I/O module to maintain the consistency between the multiple routing tables, the firmware maintains and stores state data for the routing tables. In yet another example, the firmware maintains and stores software state data for any pending events to be handled by the firmware, such as pending topology discovery events.

At block 401, a storage subsystem receives new firmware, from a storage server, for an I/O module in the storage subsystem. At block 403, the method 400 stores the new firmware in nonvolatile memory coupled to a processor in the I/O module. At block 405, the method determines the current state for the I/O module by accessing the current state data from the data stored in memory (e.g., memory 215 in FIG. 2) and stores the current state for the I/O module. The method determines one or more software states for the I/O module. The method can also determine one or more hardware states for the I/O module. At block 407, the method reboots the CPU (e.g., on the processor) for the I/O module. At block 409, the method examines the stored state data and determines that the CPU reboot was for loading the new firmware. At block 411, the method initializes the I/O module without resetting the I/O routing hardware and the external PHYs on the I/O module to avoid disrupting the processing of I/O requests by the I/O module and the method completes. The routing table stored in the I/O routing hardware is not disturbed when the CPU for the I/O module is rebooted to load the new firmware, and the I/O module, therefore, can continue to route the I/O request. In addition, in an SAS environment, the method initializes the I/O module without disrupting access to disk shelves on the other storage shelves in the same SAS domain. In a FC environment, the method initializes the I/O module without disrupting access to disk shelves on the other storage shelves in the same FC loop. The initialization of the I/O module is described in greater detail below in conjunction with FIG. 5.

Figure 5:
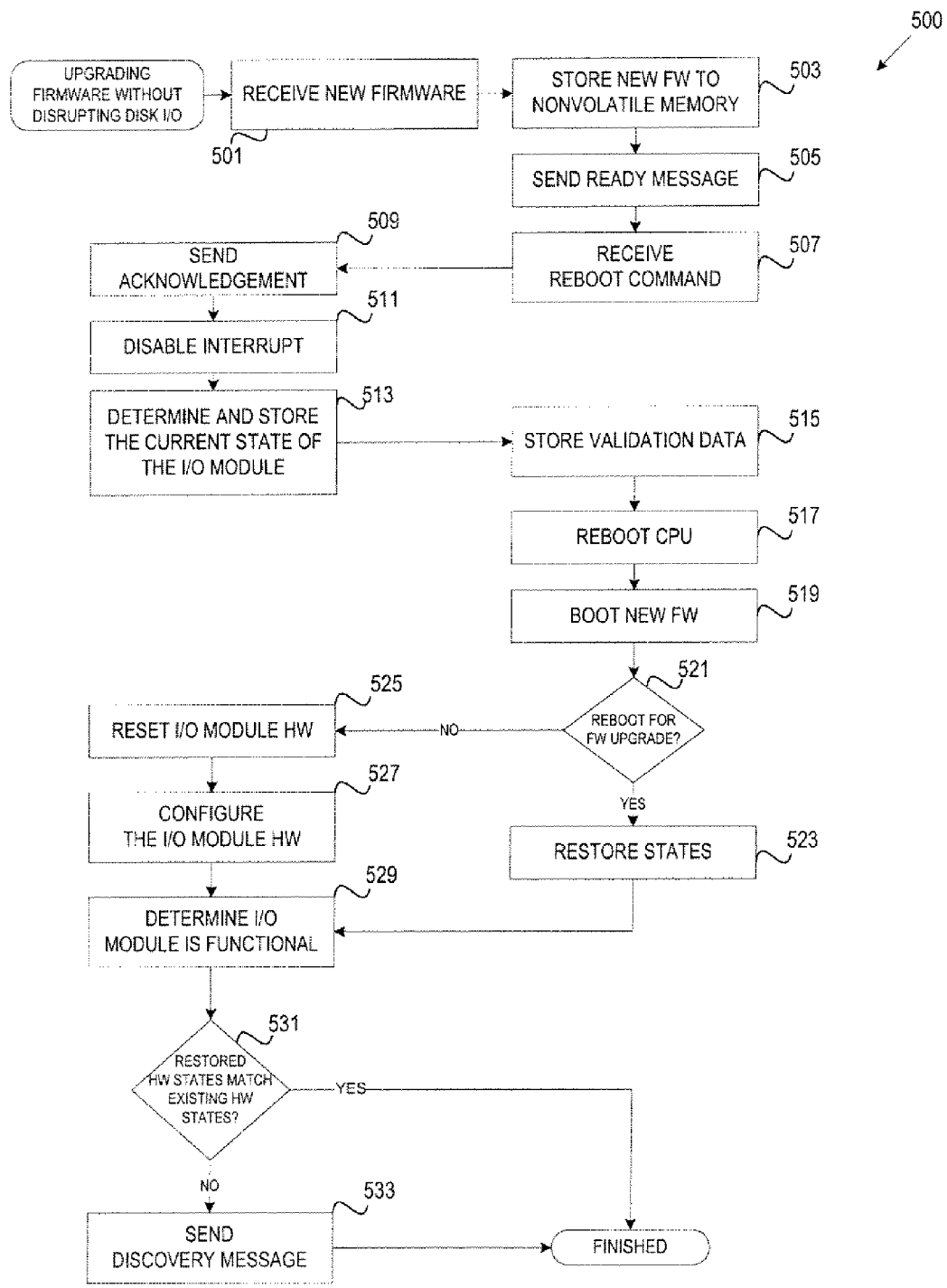
FIG. 5 illustrates another flowchart of a method for upgrading firmware for an I/O module, according to one embodiment.

FIG. 5 illustrates a flowchart for a method 500 for upgrading firmware for an I/O module without disrupting the processing of I/O requests handled by the I/O module, such as I/O module 350-1A in storage subsystem 200, executed by upgrade manager 307, according to one embodiment. At block 501, the method receives new firmware, from a storage server, for an I/O module in the storage subsystem. The storage server can send the new firmware to the I/O module processor using a SCSI command. The SCSI command can include data blocks that include the new firmware. The method 500 receives the data blocks and stores the new firmware in nonvolatile memory coupled to a processor in the I/O module at block 503. At block 505, the method receives the last data block and sends a message that the last data block was received to the storage server. The message can indicate that the storage subsystem is ready to reboot the CPU for the I/O module.

At block 507, the method 500 receives a reboot command from the storage server. The method sends a message acknowledging the reboot command to the storage server at block 509. The method delays for a time period (e.g., 10 seconds) to allow time for the storage server to receive the acknowledgement message.

At block 511, the method disables the interrupt on the I/O module to "freeze" the hardware states and software states of the I/O module. At block 513, the method 500 determines the current state of the I/O module from the state data stored in memory (e.g., memory 215 in FIG. 2). The method determines one or more current software states for the I/O module. The method can also determine one or more current hardware states for the I/O module. When the new firmware is loaded on an I/O module, the state of the hardware and software is unknown and the method 500 may not easily identify some of the hardware states. For example, the information about available hardware resources, such as the free routing table entries, is maintained by software and the method cannot obtain the current information about available hardware resources. The method 500 uses data for the current hardware states and current software states (block 513) to put the I/O module in known hardware states and software states in order to continue managing the I/O module hardware, including the I/O routing hardware, after the CPU loads the new firmware. Examples of hardware state data include, but is not limited to, routing table information, phys state information, error counter data, a copy of the hardware registers, SAS address, etc. Examples of software state data include any pending events for the firmware to process, such as link up and link down events, broadcast received events, pending topology discovery events, etc. Software state data also includes information relating to the reason a PHY is disabled (e.g., information that a PHY is disabled because the PHY has a high error link rate).

At block 515, the method 500 generates and stores firmware upgrade validation data. Validation data is used to determine whether the memory that stores the state data is corrupted (e.g., SRAM or SDRAM memory 215 in FIG. 2) or invalid (e.g., if the I/O module is just powered up). A cyclic redundancy check (CRC), which is a technique for detecting errors in digital data as known in the art, is used to protect the state data stored in memory and a checksum is used to protect the length of the stored state data. Validation data includes the length of the stored state data, a length checksum for the length of the stored state data, and a data CRC for the stored state data. For example, the length of the stored data is saved in a fixed memory block (e.g., 4 bytes) and a processor calculates a length checksum for the length based on the fixed memory block (e.g., 4 bytes). The method stores the length and the length checksum in memory (e.g., memory 215 in FIG. 2). The processor calculates a data CRC for the stored state data based on the stored state data in the memory and the length of the stored state data. The method 500 stores the data CRC in memory. For example, if there is 8 bytes of stored state data, the data CRC is calculated for the 8 bytes of state data stored in memory (e.g., memory 215 in FIG. 2). The method can store multiple sets of state data in memory to provide flexibility to add or remove state data for different firmware versions. The state data also includes a firmware version number.

At block 517, the method 500 reboots the CPU on the processor to load the new firmware to run on the I/O module. At block 519, the method boots up the new firmware. At block 521, the method determines how to initialize the I/O module by determining whether the reason for the CPU reboot was for loading the new firmware. The method examines the validation data stored in the memory (e.g., SRAM) to differentiate the reason for rebooting the CPU. The method 500 reads the length and re-computes the length checksum. The method compares the re-computed length checksum to the stored length checksum in memory. If the length checksum is not valid (block 521), the reason for the CPU reboot is not due to the firmware upgrade, or the state data is corrupted. The method continues to block 525 to reset the I/O module hardware, including the I/O routing hardware. For example, the length may be corrupted to 1000000 bytes. In such a case, there may not be a need to calculate the data CRC because the data CRC would be calculated based on the corrupted memory. If the length checksum is not valid (block 521), the method resets the I/O routing hardware which impacts (disrupts) the processing of the I/O requests by the I/O module. At block 527, the method 500 configures the I/O module hardware, including the I/O routing hardware, from a reset state which disrupts the processing of the I/O requests by the I/O module.

If the length checksum is valid (block 521), the method 500 calculates the data CRC for the stored state data. The method reads the data CRC stored in memory and compares the stored value with the calculated data CRC. If the calculated data CRC does not match the stored data CRC, the reason for the reboot is not due to the firmware upgrade (block 521), or the state data is corrupted, and the method 500 continues to block 525 to reset the I/O module hardware. If the calculated data CRC matches the stored data CRC, the reason for CPU reboot is due to firmware upgrade (block 521) and the method continues to block 523.

At block 523, in one embodiment, the method restores the software states for the I/O module using the stored stated data. In another embodiment, the method 500 restores the hardware states and software states using the stored state data to put the I/O module in a known state. The method does not reset or reconfigure the I/O routing hardware or any I/O module hardware components which can impact the I/O traffic (e.g., the external PHYs). The routing table stored in the I/O routing hardware is not disturbed when the CPU for the I/O module is rebooted to load the new firmware, and the I/O module, therefore, can continue to route the I/O request. The method, therefore, can continue to process I/O requests while the CPU is being reset and the CPU is loading the new firmware.

The method, however, cannot continue to manage or control the I/O module hardware until the software states are in a known state. For example, the virtual PHY of the I/O module manages the SES services, such as determining the number of disk drives that are present, and the SMP manages the discovery of the existing devices, newly added devices, or recently removed devices from the storage topology. The virtual PHY may be partially implemented in software. Hence when the new firmware for an I/O module is loading, the virtual PHY and the SES and SMP are not fully functional until the new firmware is fully loaded and the software states are in known states. The storage server may refrain from sending (hold) SES and SMP requests to the I/O module that is being rebooted or the storage server may send the SES and SMP request to another I/O module in the storage subsystem that is not being rebooted. The method 500 restores the software states, at block 523, using the state data stored in memory. The method 500 can reconstruct some hardware states by querying the hardware to obtain the current state from the hardware. For the hardware states that cannot be determined by querying the hardware or that take too long to be reconstructed, the method restores the hardware states using the state data stored in memory.

At block 529, the method determines that the I/O module is functional. For example, hardware registers can be read and configured without a timeout or an error. The I/O module continues managing and controlling the I/O module hardware components including the I/O routing hardware. For example, the I/O module continues to update the routing table (e.g., the routing table stored in memory 215), manage disk drive remove and insert, mange power supplies remove and insert, manage cable remove and insert, etc.

At block 531, the method 500 determines whether the restored hardware states match the existing hardware states. The hardware states may not match, for example, if a new drive was installed or an existing drive was removed while the new firmware was loading. At block 531, the method 500 checks for any new events for example, by examining the hardware registers stored as part of the state data in memory (e.g., SRAM) (at block 513) and comparing the stored hardware registers to the current hardware registers. If the hardware states match (block 531), the method completes. If the hardware states do not match (block 531), the method 500 sends a message to the storage server to discover the storage topology as is known in the art at block 533 and the method completes. For example, using the SAS protocol, the I/O module sends a primitive to the storage server to notify the storage server that the topology for the storage subsystem has changed. The storage server sends SMP requests to the I/O modules in the storage subsystem to discover the change.

In practice, the method 400 and the method 500 can constitute one or more programs made up of computer-executable instructions. Describing the method with reference to the flowcharts in FIGS. 4-5 enables one skilled in the art to develop such programs, including such instructions to carry out the operations (acts) represented by logical blocks 400 until 409 and 500 until 533 on suitably configured computers (the processor of the computer executing the instructions from computer-readable media). The computer-executable instructions can be written in a computer programming language or can be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages can be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that more or fewer processes may be incorporated into the methods illustrated in FIGS. 4-5 without departing from the scope of the invention and that no particular order is implied by the arrangement of blocks shown and described herein.

A storage system comprising a firmware upgrade architecture has been described. Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations of the present invention.

Moreover, the description of FIGS. 1-3 is intended to provide an overview of computer hardware and other operating components suitable for performing the methods of the invention described above, but are not intended to limit the applicable environments. One of skill in the art will immediately appreciate that the invention can be practiced with other computer system configurations. The invention can also be practiced in distributed computing environments where tasks are performed by remote processing devices that are linked through a communications network.

It will be readily apparent to one of skill, that input/output devices, such as a keyboard, a pointing device, and a display, can be coupled to the storage manager. These conventional features have not been illustrated for sake of clarity.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, flash memory and are typically written, by a direct memory access process, into memory during execution of software by a processor. One of skill in the art will immediately recognize that the term "computer-readable storage medium" includes any type of volatile or non-volatile storage device that is accessible by a processor.

Therefore, it is manifestly intended that this invention be limited only by the following claims and equivalents thereof.

What is claimed is:

1. A method comprising:
receiving, by a storage subsystem, new firmware from a storage server for an I/O module in the storage subsystem;
storing, by the storage subsystem, state data for the I/O module;
rebooting, by the storage subsystem, a CPU for the I/O module to load the new firmware;
determining after reboot, by the storage subsystem, that the reboot was for loading the new firmware based on the stored state data;
initializing, by the storage subsystem, the I/O module to use the new firmware, wherein the initializing is based on the stored state data, does not reset I/O routing hardware on the I/O module, and is independent of the I/O module processing a request to access data stored on disks coupled to the I/O module;
restoring, by the storage subsystem, a software state for the I/O module using the stored state data;
restoring a hardware state for the I/O module using the stored state data;
comparing a copy of hardware registers in the stored state data to current hardware registers;
sending a primitive to the storage server for the storage server to discover a change in the storage subsystem if the hardware registers do not match; and
managing, by the storage subsystem, the I/O routing hardware on the I/O module using the new firmware.

2. The method of claim 1, wherein the state data is for at least one of a hardware state and a software state for the I/O module.

3. The method of claim 1, wherein storing the state data comprises:
determining a length of the stored state data;
determining a length checksum for the length;
calculating a data CRC for the stored state data; and
storing the length, length checksum, and data CRC.

4. The method of claim 3, wherein determining that the reboot was for loading the new firmware comprises:
reading the stored length and length checksum from memory;
determining the length checksum is valid;
calculating a new data CRC for the stored state data;
comparing the new data CRC to the stored data CRC; and
determining the data CRC is valid.

5. The method of claim 1, wherein rebooting the CPU comprises rebooting a CPU on a device that includes the data I/O routing hardware.

6. The method of claim 1, wherein rebooting the CPU comprises rebooting a CPU on a device that is separate from a device that includes the data I/O routing hardware.

7. A networked storage system comprising:
a storage server to send new firmware to a storage subsystem, wherein the new firmware is for an I/O module in the storage subsystem;
the storage subsystem, coupled to the storage server, comprising the I/O module, wherein the I/O module comprises I/O routing hardware to process a I/O request to access data stored on disks coupled to the I/O module, memory to store state data for the I/O module;
a CPU on a processor configured to:

reboot for loading the new firmware,
determine after reboot that the reboot was for loading the new firmware,
restore a software state for the I/O module based on the stored state data,
restore a hardware state for the I/O module using the stored state data,
compare a copy of hardware registers in the stored state data to current hardware registers,
send a primitive to the storage server for the storage server to discover a change in the storage subsystem if the hardware registers do not match, and
enable the I/O module to use the new firmware without resetting the I/O routing hardware.

8. The networked storage system of claim 7, wherein the I/O routing hardware comprises:
a connection manager to map a I/O request destination address to a destination physical layer device; and
a connection router to route an I/O request to a destination physical layer device.

9. The networked storage system of claim 7, wherein the CPU is on a device that includes the data I/O routing hardware.

10. The networked storage system of claim 7, wherein the CPU is on a device that is separate from a device that includes the data I/O routing hardware.

11. The networked storage system of claim 7, wherein the state data is for at least one of a hardware state and a software state for the I/O module.

12. An apparatus comprising:
memory to store state data for an I/O module;
I/O routing hardware to process a I/O request to access data stored on disks coupled to the I/O routing hardware; and
a CPU on a processor, coupled to the I/O routing hardware and to the memory, the CPU configured to:
reboot for loading the new firmware,
determine after reboot that the reboot was for loading the new firmware,
restore a software state for the I/O module based on the state data to enable the I/O module to use the new firmware without resetting the I/O routing hardware,
restore a hardware state for the I/O module using the stored state data,
compare a copy of hardware registers in the stored state data to current hardware registers, and
send a message to a storage server to discover a topology of the storage subsystem if the hardware registers do not match.

13. The apparatus of claim 12, wherein the state data is for at least one of a hardware state and a software state for the I/O module.

14. The apparatus of claim 12, wherein the CPU is embedded in a device that includes the data I/O routing hardware.

15. The apparatus of claim 12, wherein the CPU is on a device that is separate from a device that includes the data I/O routing hardware.

16. A method comprising:
receiving, by a storage subsystem, new firmware from a storage server;
storing, by the storage subsystem, state data for an I/O module in the storage subsystem;
loading, by the storage subsystem, the new firmware on the I/O module;
initializing, by the storage subsystem, the I/O module, wherein initializing does not reset I/O routing hardware on the I/O module and is independent of the I/O module processing a request to access data stored on disks coupled to the I/O module;
restoring, by the storage subsystem, a software state for the I/O module using the stored state data;
restoring, by the storage subsystem, a hardware state for the I/O module using the stored state data;
comparing, by the storage subsystem, a copy of hardware registers in the stored state data to current hardware registers;
sending, by the storage subsystem, a message to the storage server to discover a topology of the storage subsystem if the hardware registers do not match; and
managing, by the storage subsystem, the I/O routing hardware on the I/O module using the new firmware.

17. The method of claim 16, wherein the state data is for at least one of a hardware state and a software state for the I/O module.

18. The method of claim 16, wherein storing the state data comprises:
determining a length of the stored state data;
determining a length checksum for the length;
calculating a data CRC for the stored state data; and
storing the length, length checksum, and data CRC.

19. The method of claim 18, wherein determining that the reboot was for loading the new firmware comprises:
reading the stored length and length checksum from memory;
determining the length checksum is valid;
calculating a new data CRC for the stored state data;
comparing the new data CRC to the stored data CRC; and
determining the data CRC is valid.

* * * * *